(12) United States Patent
Miller et al.

(10) Patent No.: US 12,516,724 B2
(45) Date of Patent: Jan. 6, 2026

(54) SYSTEMS AND METHODS FOR HEATING A GEARBOX PRIOR TO FAN ROTATION

(71) Applicant: General Electric Company, Schenectady, NY (US)

(72) Inventors: Brandon W. Miller, West Chester, OH (US); Andrew Hudecki, Milford, OH (US); Arthur W. Sibbach, Boxford, MA (US); Kirk D. Gallier, Liberty Township, OH (US); Ravindra Shankar Ganiger, Bangalore (IN); Ryan T. Roehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/626,584

(22) Filed: Apr. 4, 2024

(65) Prior Publication Data
US 2025/0314293 A1    Oct. 9, 2025

(51) Int. Cl.
*F16H 57/04* (2010.01)

(52) U.S. Cl.
CPC ..... *F16H 57/0415* (2013.01); *F16H 57/0413* (2013.01); *F16H 57/0416* (2013.01); *F16H 57/0435* (2013.01)

(58) Field of Classification Search
CPC ............. F16H 57/0412; F16H 57/0413; F16H 57/0415; F16H 57/0416; F16H 57/0435; F01M 5/001; F01M 5/021
See application file for complete search history.

(56) References Cited

U.S. PATENT DOCUMENTS

| | | | |
|---|---|---|---|
| 7,662,059 B2 | 2/2010 | McCune | |
| 7,883,438 B2 | 2/2011 | McCune | |
| 8,117,905 B2 * | 2/2012 | Hofer | G01M 15/02 73/114.68 |
| 8,443,582 B1 | 5/2013 | Phillips et al. | |
| 9,742,343 B2 * | 8/2017 | Okamoto | H02P 6/00 |
| 10,054,053 B2 * | 8/2018 | Thiriet | F01D 25/36 |
| 10,087,793 B2 * | 10/2018 | Boyer | F16K 31/002 |
| 10,371,007 B2 | 8/2019 | Cigal et al. | |
| 10,513,949 B2 | 12/2019 | Parnin et al. | |
| 10,823,005 B2 | 11/2020 | Fang et al. | |
| 10,975,769 B2 | 4/2021 | Segura Martinez De Ilarduya et al. | |
| 11,066,954 B2 | 7/2021 | Sheridan | |

(Continued)

FOREIGN PATENT DOCUMENTS

FR    3112365 A1    1/2022

*Primary Examiner* — Minh Truong
(74) *Attorney, Agent, or Firm* — Venable LLP; Peter T. Hrubiec; Michele V. Frank

(57) ABSTRACT

A turbine engine operable in a cold start condition to prevent wear on components of a gearbox assembly of the turbine engine. The turbine engine includes a gearbox assembly, a pump for directing lubricant to the gearbox assembly, a supply line heating path comprising a heat exchanger, a recirculation bypass path, a valve being positionable between a first position to direct the flow of the lubricant into the supply line heating path and a second position to direct the flow of the lubricant into the recirculation bypass path, and an electronic control unit configured to position the valve between the first position and the second position based on a temperature of the lubricant.

20 Claims, 8 Drawing Sheets

(56) References Cited

U.S. PATENT DOCUMENTS

| | | |
|---|---|---|
| 11,092,037 B2 | 8/2021 | Valva et al. |
| 11,136,908 B2 * | 10/2021 | McCormick ............ F01M 5/002 |
| 11,236,672 B2 * | 2/2022 | Roberge .................... F01M 1/02 |
| 11,428,307 B2 * | 8/2022 | Ishiyama ............. F16H 57/0435 |
| 11,549,393 B2 | 1/2023 | Cleyet et al. |
| 2002/0128107 A1 * | 9/2002 | Wakayama ......... F16H 57/0412 |
| | | 475/161 |
| 2023/0250771 A1 | 8/2023 | Alecu |
| 2023/0323941 A1 * | 10/2023 | Deport ..................... F16N 29/00 |
| | | 184/6 |

* cited by examiner

SYSTEMS AND METHODS FOR HEATING A GEARBOX PRIOR TO FAN ROTATION

TECHNICAL FIELD

The present specification generally relates to turbine engines and, more specifically, to systems and methods for heating a gearbox of a turbine engine prior to fan rotation.

BACKGROUND

Gearboxes are widely used in various turbine engine applications based on their torque transmission capability. The efficient operation of these gearboxes relies heavily on effective lubrication to reduce friction, wear, and overheating. During cold starting conditions, lubricant, such as oil, being delivered to various components of an engine, such as the gearboxes, may have an extremely high viscosity. This leads to very high pump power requirements and increased risk of oil flow starvation, especially to the more sensitive parts of the gearbox, such as the journal bearings. Excessive viscosity within the journal bearings of the gearbox may lead to pockets of extremely stiff oil that results in an axis of rotation of a pin guide to move off axis. This leads to an eccentric rotation reducing mechanical clearance between adjacent components and increased wear. Accordingly, a need exists for systems and methods for heating the gearbox prior to allowing the gearbox to rotate to reduce wear and increase a useful life of the gearbox.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
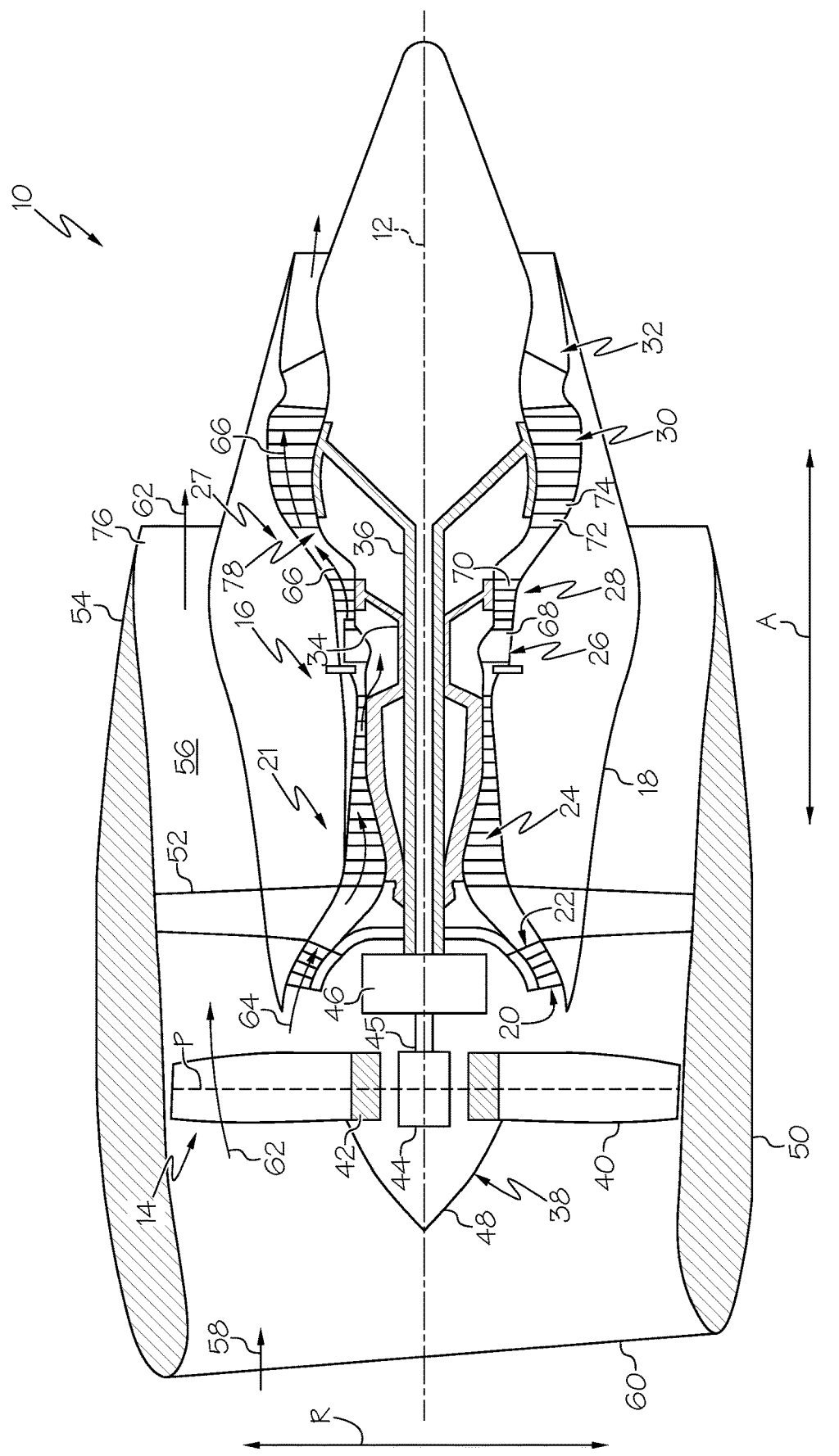
FIG. 1 schematically depicts a cross-sectional diagram of a turbine engine, taken along a centerline axis of the turbine engine, according to an embodiment of the present disclosure.

Embodiments described herein are directed to systems and methods for operating a gearbox assembly of a turbine engine in a cold start condition to prevent wear on components of a gearbox assembly of the turbine engine. The turbine engine includes a gearbox assembly, a pump for directing lubricant to the gearbox assembly, a valve located downstream of the pump for controlling a flow of the lubricant, a supply line heating path comprising a heat exchanger, and a recirculation bypass path, wherein the valve controls the flow of the lubricant into one of the supply line heating path and the recirculation bypass path based on a temperature of the lubricant. Whenever possible, the same reference numerals will be used throughout the drawings to refer to the same or like parts.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the turbine engine or vehicle. More particularly, forward and aft are used herein to refer to a direction of travel and a direction of propulsive thrust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is a schematic cross-sectional diagram of a turbine engine 10, taken along a longitudinal, centerline axis 12 of the turbine engine 10, according to an embodiment of the present disclosure. As shown in FIG. 1, the turbine engine 10 defines an axial direction A (extending parallel to the centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
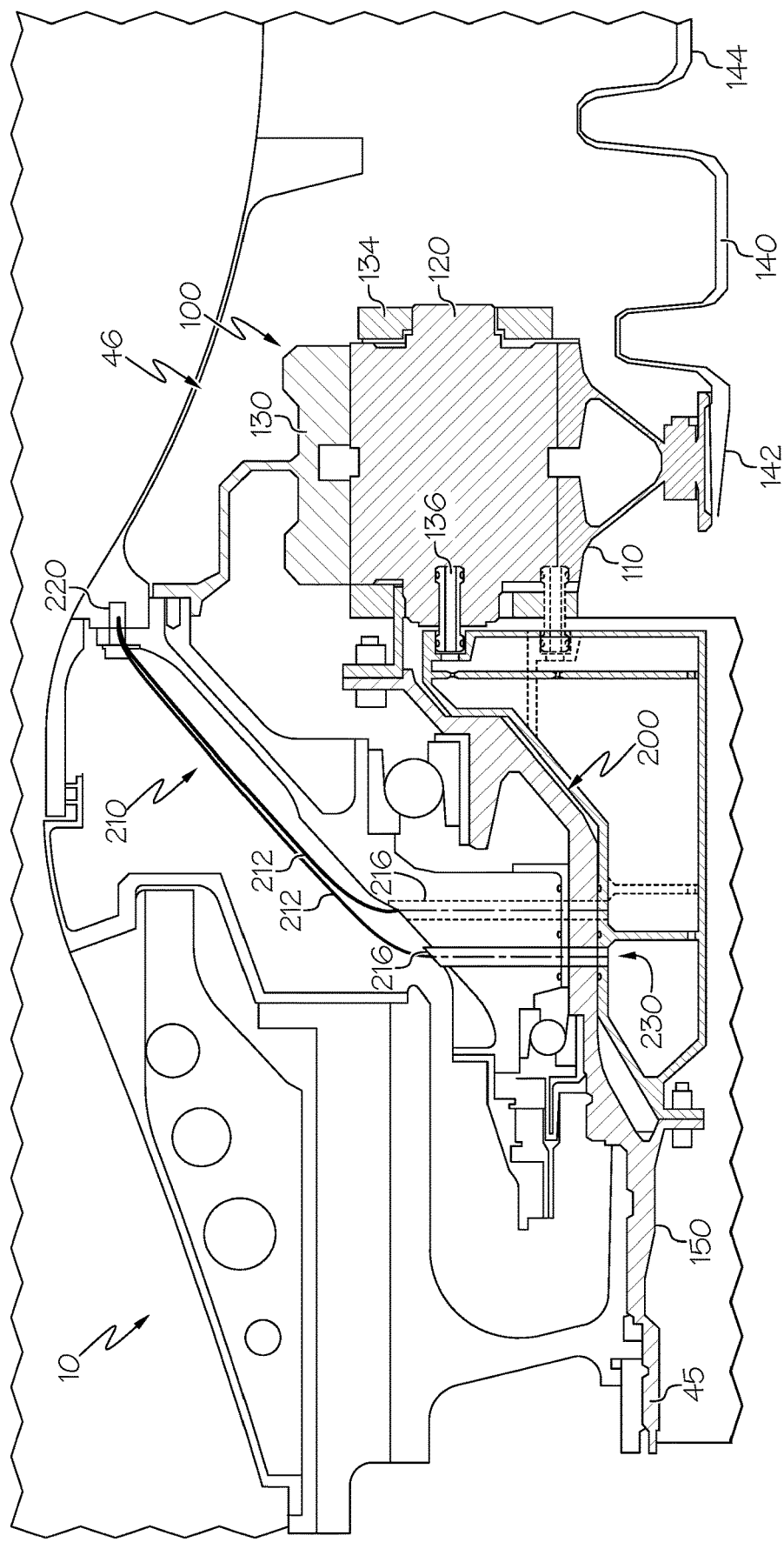
FIG. 2 schematically depicts a cross-sectional side view of a gearbox assembly for a turbine engine, taken along the centerline axis of the turbine engine, according to an embodiment of the present disclosure.

Referring now to FIG. 2, a cross-sectional side view of the gearbox assembly 46 is depicted. In these embodiments, the gearbox assembly 46 includes a planetary gear assembly 100, which is configured to transmit torque in order to drive the fan 38 (FIG. 1) of the turbine engine 10. In these embodiments, the planetary gear assembly 100 includes a sun gear 110, a plurality of planet gears 120 (only one of which is visible in FIG. 2), and a ring gear 130. The planetary gear assembly 100 may further include a planet carrier 134, configured to secure the plurality of planet gears 120 in their relative positions, as will be described in additional detail herein. The planet carrier 134 is drivingly connected to the fan 38 (FIG. 1).

Referring still to FIG. 2, an input shaft 140 is coupled to the sun gear 110, and configured to introduce mechanical power to the planetary gear assembly 100. As depicted in FIG. 2, the input shaft 140 includes a first end 142 and a second end 144, with the first end 142 being coupled to the sun gear 110 and the second end 144 being coupled to a power source (e.g. via a coupling and/or clutching mechanism) that allows the input shaft 140 to transmit torque from the power source to the planetary gear assembly 100. In these embodiments, it should be appreciated that the input shaft 140 rotates at a speed determined by the power source, and the rotational motion of the input shaft 140 drives the planetary gear assembly 100.

In some embodiments, to integrate the planetary gear assembly 100 into the turbine engine 10, the second end 144 of the input shaft 140 may be mechanically coupled to the turbine section 27 (FIG. 1) of the turbine engine 10. For example, the input shaft 140 may be mechanically coupled to the LP shaft 36 (FIG. 1). Accordingly, in these embodiments, the LP shaft 36 (FIG. 1) may act as the power source for the input shaft 140, such that rotation of the LP shaft 36 causes rotation of the input shaft 140. As will be described in additional detail herein, the rotation of the input shaft 140 may drive the various components of the planetary gear assembly 100.

Referring still to FIG. 2, the sun gear 110 may be centrally positioned within the planetary gear assembly 100 such that the remaining components (e.g., the plurality of planet gears 120) revolve and/or rotate about the sun gear 110. For example, the sun gear 110 may be a cylindrical gear having a plurality of outward facing teeth that are configured to engage the plurality of planet gears 120. Accordingly, in these embodiments, the sun gear 110 may be configured to distribute power from the input shaft 140 to the plurality of planet gears 120. As the sun gear 110 transfers power from the input shaft 140 to the plurality of planet gears 120, the sun gear 110 may cause the plurality of planet gears 120 to rotate about their axis and orbit (i.e., rotate about) the sun gear 110.

In these embodiments, it should be appreciated that the size and tooth count of the sun gear 110 impacts the gear ratio of the planetary gear assembly 100. For example, the tooth count and size impacts the rotational speed and the torque conversion capabilities of the sun gear 110, which in turn influences the rotation of the plurality of planet gears 120. In these embodiments, decreasing the tooth count of the sun gear 110 increases speed and decreases torque, while increasing the tooth count increases torque while reducing rotational speed.

Referring still to FIG. 2, and as has been described herein, the plurality of planet gears 120 is coupled to the sun gear 110 such that rotational motion of the sun gear 110 is transferred to the plurality of planet gears 120. In these embodiments, the planet gears 120 may be smaller than the sun gear 110 and may be mounted equidistantly around the sun gear 110. In these embodiments, each of the plurality of planet gears 120 may include a plurality of teeth, which may be configured to engage the teeth of the sun gear 110 and the ring gear 130, as will be described in additional detail herein. Although the planet gears 120 are described herein as being equidistantly spaced about the sun gear 110, it should be appreciated that, in some embodiments, the plurality of planet gears 120 may be variably spaced about the sun gear 110 without departing from the scope of the present disclosure.

In operation, the rotation and orbit of the plurality of planet gears 120 relative to the sun gear 110 generates an output of the planetary gear assembly 100. For example, the plurality of planet gears 120 may increase or decrease the rotational speed and/or reverse a direction of rotation of the output of the planetary gear assembly 100 relative to the input Referring still to FIG. 2, the plurality of planet gears 120 is further coupled to the planet carrier 134, which is configured to hold and/or support the plurality of planet gears 120. In these embodiments, the planet carrier 134 may allow each of the plurality of planet gears 120 to orbit the sun gear 110 while rotating about each of their own axes. To allow for each of the planet gears 120 to rotate about their own axes as the planet gears 120 orbit the sun gear 110, each of the plurality of planet gears 120 may be mounted to the planet carrier 134 using a bearing 136.

In the embodiments described herein, the bearings 136 may be needle bearings, roller bearings (e.g., tapered roller bearings, etc.), ball bearings, journal bearings, or any other similar bearing capable of allowing the plurality of planet gears 120 to rotate about their axes. It should be appreciated that the bearings 136 can facilitate smooth rotation of the planet gears 120, and may be further configured to withstand the radial and/or axial loads experienced by the plurality of planet gears 120 during operation of the planetary gear assembly 100. In addition, the bearings 136 may further aid in maintaining alignment of the plurality of planet gears 120 during operation of the planetary gear assembly 100, which may ensure that plurality of planet gears 120 maintain proper meshing with the sun gear 110 and are able to efficiently transfer power during operation.

As further illustrated in FIG. 2, the plurality of planet gears 120 is further configured to interface with the ring gear 130. In these embodiments, the ring gear 130 may be an annular gear, or any other similar gear, having a plurality of teeth on an interior surface of the gear for engaging the plurality of planet gears 120. As depicted in FIG. 2, the ring gear 130 may encircle that planetary gear set (e.g., the plurality of planet gears 120 and sun gear 110) such that the ring gear 130 acts as a housing. In these embodiments, the planet carrier 134 transmits forces to the fan 38 (FIG. 1) to drive the turbine engine 10.

Referring still to FIG. 2, the planetary gear assembly 100 may further include an output shaft 150. In these embodiments, the output shaft 150 may be mechanically coupled to the planet carrier 134, which may be utilized to provide power to the output shaft 150. For example, in the embodiments described herein, when the plurality of planet gears 120 are driven and the sun gear 110 remains stationary, the plurality of planet gears 120 orbit the sun gear 110 and rotate against the ring gear 130. In these embodiments, rotation of the plurality of planet gears 120 against the ring gear 130 may cause the planet carrier 134 to rotate, thereby transferring power from the planet carrier 134 to the fan 38 (FIG. 1).

In these embodiments, the ring gear 130 is a stationary member, while the sun gear 110 is driven by the input shaft 140 and the planet carrier 134 transmits power via the planet gears 120. With the ring gear 130 configured as a stationary component, the rotation of the plurality of planet gears 120 causes the planet carrier 134 to rotate, with the rotation of the planet carrier 134 driving the output shaft 150. It should be appreciated that, in the embodiments described herein, the configuration of the output shaft 150 may be determined based on a desired gear ratio and power transfer efficiency within the planetary gear assembly 100.

Referring still to FIG. 2, the output shaft 150 may be further coupled to the fan 38 (FIG. 1), such that rotation of the output shaft 150 drives rotation of the fan 38 (FIG. 1) about the centerline axis 12. For example, in these embodiments, the output shaft 150 may be coupled to the fan shaft 45 (FIG. 1), such that rotation of the output shaft 150 drives the fan shaft 45, and in turn, the fan 38. In the embodiments described herein, the output shaft 150 may include a cylindrical rod, or any other similarly shaped shaft, formed of a material having a strength sufficient to withstand the torque and load transmitted by the output shaft 150 (e.g., steel, other similar alloys, etc.).

In the embodiments described herein, it should be appreciated that the speed at which the various components of the planetary gear assembly 100 rotate and the torque that is generated and transmitted across the planetary gear assembly 100 is a function of the gear ratio within the planetary gear assembly 100 and the power input into the planetary gear assembly 100 (e.g., via the turbine section 27, as depicted in FIG. 1). Accordingly, it may be possible to adjust various features of the planetary gear assembly 100 (e.g., size and tooth count of the sun gear 110, planet gears 120, ring gear 130, etc.) as described herein to optimize the efficiency of the gearbox assembly 46 for a particular application.

To ensure that the various moving components of the gearbox assembly 46 remain properly lubricated during operation, the gearbox assembly 46 may further include a lubricant transfer unit 200 configured to supply a lubricant (e.g., oil, etc.) to the planetary gear assembly 100 and the output shaft 150. In these embodiments, the lubricant transfer unit 200 may further include a plurality of lubricant lines 210, which may extend between a reservoir 220 of the lubricant transfer unit 200 and a plurality of interfaces 230 configured to supply lubricant to the gearbox assembly 46 via the lubricant transfer unit 200.

In the embodiments described herein, the plurality of lubricant lines 210 may include a plurality of lubricant supply lines 212 and a plurality of lubricant supply conduits 216 coupled to the lubricant supply lines 212. The lubricant supply conduits 216 may act to fluidly couple the lubricant supply lines 212 to the plurality of interfaces 230. In these embodiments, the lubricant supply lines 212 may be configured to provide lubricant to the planetary gear assembly 100. The plurality of lubricant lines 210 may be formed of any material capable of withstanding high-pressure and/or temperatures, such as stainless steel, reinforced synthetic materials, or any other similar materials, and may be configured to be both durable and flexible enough to accommodate movement and vibrations generated by the turbine engine 10 during operation.

The plurality of lubricant lines 210 may further include mechanisms for controlling the pressure and flow rate of lubricant within the lubricant transfer unit 200. For example, the lubricant supply lines 212 may include a valve, pressure regulator, or other similar component configured to control a volume of lubricant within the lubricant transfer unit 200 as the planetary gear assembly 100 operates.

Referring still to FIG. 2, and as previously described herein, the plurality of lubricant lines 210 extend from the reservoir 220 to the plurality of interfaces 230. In this embodiment, the reservoir 220 may be configured to store the lubricant (e.g., oil, etc.) that circulates through the planetary gear assembly 100.

In the embodiments described herein, each of the plurality of interfaces 230 may be associated with particular components of the planetary gear assembly 100, such that the lubricant transfer unit 200 may selectively supply lubricant to various components of the planetary gear assembly 100 and control the flow rate and volume of lubricant provided to each of the various components. In these embodiments, the plurality of interfaces 230 may be further sized and/or shaped to regulate a pressure of the lubricant being supplied to the planetary gear assembly 100. For example, in the embodiments described herein, excessive pressure may result in leakage and/or inadequate lubrication of the various components of the planetary gear assembly 100. By altering the size and/or shape of the plurality of interfaces 230 of the lubricant transfer unit 200, it may be possible to ensure that the lubricant entering the planetary gear assembly 100 is maintained at a desired pressure.

Figure 3:
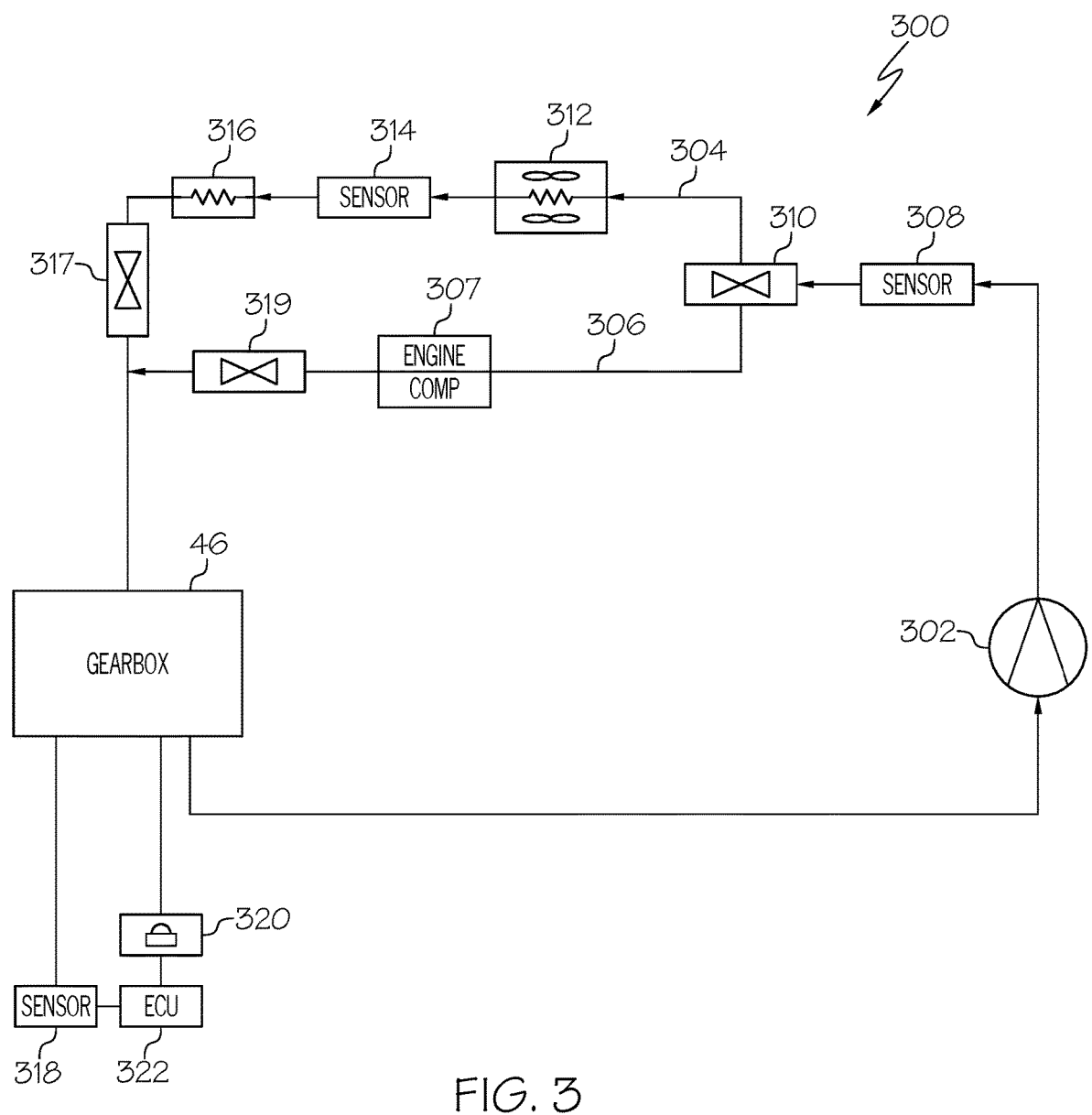
FIG. 3 schematically depicts an embodiment of a lubricant heating system, according to an embodiment of the present disclosure.

Referring now to FIG. 3, an embodiment of a lubricant heating system 300 is schematically depicted, which includes a gearbox such as, for example, the planetary gearbox assembly 46 described herein and illustrated in FIG. 2. However, it should be appreciated that the lubricant heating system 300 may include other embodiments of gearboxes such as, for example, a helical gearbox, a coaxial helical inline gearbox, a bevel helical gearbox, a skew bevel helical gearbox, a right-angle gearbox, a spur gearbox, a concentric gearbox, and the like. However, reference will be made throughout the ensuing description as the lubricant heating system 300 including the planetary gearbox assembly 46.

In embodiments, the lubricant heating system 300 includes a pump 302, which directs lubricant to either one of a supply line heating path 304 or a recirculation bypass path 306 based on a temperature of the lubricant detected by a first lubricant temperature sensor 308. The lubricant, which may be heated while flowing through the supply line heating path 304 or the recirculation bypass path 306 to reduce a viscosity of the lubricant, is then directed to the gearbox assembly 46 to increase the temperature of the gearbox assembly 46. As described in more detail herein, once a temperature of the gearbox assembly 46 reaches a predetermined gearbox temperature threshold, the gearbox assembly 46 is permitted to rotate, thus allowing the fan 38 (FIG. 1) to rotate as well. At low temperatures, the lubricant can have high viscosity, which can result in eccentric rotation of the components of the gearbox assembly 46 and increase wear on the components of the gearbox assembly 46 and the fan 38. Accordingly, by preventing the gearbox assembly 46 from operating prior to the temperature of the gearbox assembly 46 reaching the predetermined gearbox temperature threshold, such wear is reduced.

The first lubricant temperature sensor 308 may be positioned in direct contact with the lubricant or, in other embodiments, positioned external of the lubricant to detect a temperature of a conduit through which the lubricant flows. The first lubricant temperature sensor 308 may include any suitable temperature sensor such as, for example, a thermocouple, a resistance temperature sensor, a thermistor, or the like. The lubricant heating system 300 further includes a valve 310 positionable between a first position in which the lubricant is directed to the supply line heating path 304 and a second position in which the lubricant is directed to the recirculation bypass path 306. The valve 310 may be any suitable directional control valve. As shown in FIG. 2, the first lubricant temperature sensor 308 is located upstream of the valve 310, i.e., between the pump 302 and the valve 310.

As described in more detail herein, the valve 310 is positioned into the first position when the first lubricant temperature sensor 308 detects a temperature of the lubricant is equal to or exceeds a first predetermined lubricant temperature threshold. The valve 310 is positioned into the second position when the first lubricant temperature sensor 308 detects a temperature of the lubricant is less than the first predetermined lubricant temperature threshold.

With the valve 310 in the first position, the lubricant is directed into the supply line heating path 304. The supply line heating path 304 includes a heat exchanger 312, a second lubricant temperature sensor 314, and, in embodiments, a supply line heater 316. In embodiments, the heat exchanger 312 is an air cooled oil cooler (ACOC). However, the heat exchanger 312 may be any suitable device for drawing heat away from the lubricant. Accordingly, as the valve 310 directs lubricant into the supply line heating path 304 when the temperature of the lubricant is equal to or exceeds the first predetermined lubricant temperature threshold, the heat exchanger 312 operates to draw heat away from the lubricant, thereby lowering the temperature of the lubricant.

The second lubricant temperature sensor 314 is provided downstream of the heat exchanger 312 and configured to detect a temperature of the lubricant after the lubricant passes through the heat exchanger 312. Accordingly, the second lubricant temperature sensor 314 determines how much heat has been drawn off from the lubricant after passing through the heat exchanger 312 based on the initial temperature of the lubricant as detected by the first lubricant temperature sensor 308 prior to entering the supply line heating path 304. The second lubricant temperature sensor 314 may include any suitable temperature sensor such as, for example, a thermocouple, a resistance temperature sensor, a thermistor, or the like.

The supply line heater 316, if provided, is activated in response to the second lubricant temperature sensor 314 detecting that the temperature of the lubricant is less than a second predetermined lubricant temperature threshold. In embodiments, the supply line heater 316 includes a vortex swirler, joule heating device, ground cart, or any other suitable heating device. Alternatively, if the temperature of the lubricant is equal to or greater than the second predetermined lubricant temperature threshold, the supply line heater 316 is not activated. In other embodiments, the supply line heater 316 may remain in a constantly active state, but the lubricant is routed around the supply line heater 316 if the temperature of the lubricant is equal to or greater than the second predetermined lubricant temperature threshold such that the lubricant is not additionally heated. Once the lubricant passes the supply line heater 316, the lubricant continues to the gearbox assembly 46 such that heat from the lubricant may be utilized to heat the gearbox assembly 46, and specifically the individual components of the gearbox assembly 46.

In embodiments, the supply line heating path 304 includes a one-way valve 317. The one-way valve 317 is provided downstream of the supply line heater 316 and prevents the lubricant from flowing backward within the supply line heating path 304. The one-way valve 317 may be any suitable type of valve for permitting the flow of fluid in only one direction such as, for example, a swing check valve, a ball check valve, a stop check valve, a flapper valve, and the like.

With the valve 310 in the second position, the lubricant is directed into the recirculation bypass path 306. The valve 310 may be actuated to the second position such that when the temperature of the lubricant is less than the first predetermined lubricant temperature threshold, as detected by the first lubricant temperature sensor 308. The recirculation bypass path 306 extends along the turbine engine 10 (FIG. 1) so as to cause the lubricant to pass through or around one or more engine components 307 of the turbine engine 10 that are operated prior to operation of the gearbox assembly 46. For example, the one or more engine components 307 may include, pumps, scavenge elements, sumps, bearings, gears, accessory gearboxes, and the like. The lubricant within recirculation bypass path 306 is heated by the relatively higher temperatures of the one or more engine components 307. The heated lubricant is then delivered to the gearbox assembly 46 from the recirculation bypass path 306 to heat the gearbox assembly 46.

In embodiments, the recirculation bypass path 306 includes a one-way valve 319. The one-way valve 319 is provided downstream of the one or more engine components 307 and prevents the lubricant from flowing backward within the recirculation bypass path 306. Similar to the one-way valve 317, the one-way valve 319 may be any suitable type of valve for permitting the flow of fluid in only one direction such as, for example, a swing check valve, a ball check valve, a stop check valve, a flapper valve, and the like.

The lubricant heating system 300 further includes a gearbox temperature sensor 318, a fan rotor lock 320, and an electronic control unit 322. The gearbox temperature sensor 318 is positioned relative to the gearbox assembly 46 to detect a temperature of the gearbox assembly 46. The gearbox temperature sensor 318 may include any suitable temperature sensor such as, for example, a thermocouple, a resistance temperature sensor, a thermistor, or the like. The fan rotor lock 320 is configured to either permit or inhibit operation of the gearbox assembly 46, and thus the fan 38 (FIG. 1). The gearbox temperature sensor 318 and the fan rotor lock 320 are each communicatively coupled to the electronic control unit 322.

The electronic control unit 322 includes one or more processors and one or more memory modules. Each of the one or more processors may be any device capable of executing machine readable and executable instructions. Accordingly, each of the one or more processors may be a controller, an integrated circuit, a microchip, a computer, or any other computing device. The one or more memory modules may comprise RAM, ROM, flash memories, hard drives, or any device capable of storing machine readable and executable instructions such that the machine readable and executable instructions can be accessed by the one or more processors. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the electronic control unit 322 is also communicatively coupled to the first lubricant temperature sensor 308, the valve 310, the second lubricant temperature sensor 314, and the supply line heater 316. Accordingly, the electronic control unit 322 receives a signal from the first lubricant temperature sensor 308 and operates the valve 310 based on a detected temperature of the lubricant, as described herein. Additionally, the electronic control unit 322 receives a signal from the second lubricant temperature sensor 314 and operates the supply line heater 316 based on a detected temperature of the lubricant, as described herein.

The gearbox temperature sensor 318 continually detects a temperature of the gearbox assembly 46 and transmits a signal to the electronic control unit 322 indicating a temperature of the gearbox assembly 46. The electronic control unit 322 determines whether the temperature of the gearbox assembly 46 is equal to or exceeds the predetermined gearbox temperature threshold. If so, the electronic control unit 322 transmits a signal to the fan rotor lock 320 to position the fan rotor lock 320 into an unlocked position and permit the gearbox assembly 46, and thus the fan 38 (FIG. 1), to rotate. Alternatively, if the electronic control unit 322 determines that the temperature of the gearbox assembly 46 is less than the predetermined gearbox temperature threshold, the electronic control unit 322 transmits a signal to the fan rotor lock 320 to position, or maintain a position, of the fan rotor lock 320 into a locked position to inhibit rotation of the gearbox assembly 46, and thus the fan 38 (FIG. 1).

Although embodiments are described herein in which the lubricant is heated either by the supply line heater 316 or by drawing heat from engine components 307 as the lubricant passes through the recirculation bypass path 306, it should be appreciated that only one of the supply line heater 316 in the supply line heating path 304 and the recirculation bypass path 306 may be provided. As such, embodiments are contemplated in which the recirculation bypass path 306 is provided and the supply line heating path 304 does not include the supply line heater 316. Additionally, other embodiments are contemplated in which the supply line heater 316 is provided within the supply line heating path 304 and the recirculation bypass path 306 is not provided.

Figure 4:
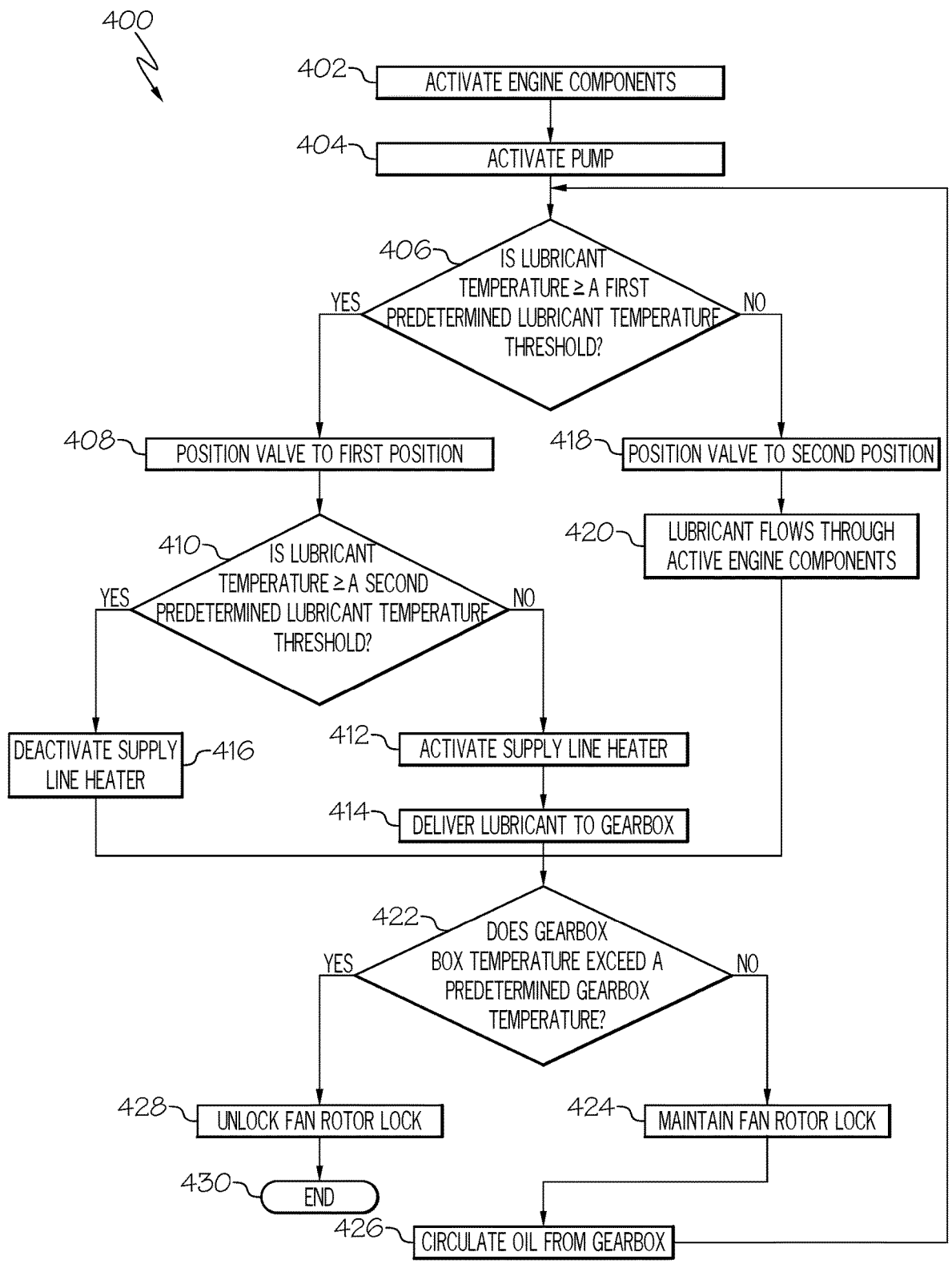
FIG. 4 depicts a flowchart for operating the lubricant heating system of FIG. 3, according to an embodiment of the present disclosure.

Referring now to FIG. 4, a method 400 is depicted for operating the lubricant heating system illustrated in FIG. 3. Initially, at step 402, the turbine engine 10 is activated such that select engine components, such as the pumps, scavenge elements, sumps, bearings, gears, and/or accessory gearboxes, are activated. At step 404, the pump is operated to push lubricant through the lubricant heating system. At step 406, the first lubricant temperature sensor detects a temperature of the lubricant and transmits the temperature data to the electronic control unit 322, which determines whether the temperature of the lubricant is equal to or exceeds a first predetermined lubricant temperature threshold.

If it is determined at step 406 by the electronic control unit 322 that the temperature of the lubricant is equal to or exceeds the first predetermined lubricant temperature threshold, the method 400 proceeds to step 408 at which the valve 310 is positioned into the first position and the lubricant is directed into the heat exchanger 312 in the supply line heating path 304. As discussed herein, the heat exchanger 312 draws heat off of the lubricant. Thereafter, at step 410, the second lubricant temperature sensor 314 transmits the temperature data to the electronic control unit 322, which determines whether the temperature of the lubricant, after flowing through the heat exchanger 312, is equal to or exceeds the second predetermined lubricant temperature threshold. If so, the method 400 proceeds to step 412 at which the supply line heater 316 is activated to re-heat the lubricant. At step 414, the lubricant is directed to the gearbox assembly 46. Alternatively, if it is determined by the electronic control unit 322 at step 410 that the temperature of the lubricant is less than the second predetermined lubricant temperature threshold, the supply line heater 316 is deactivated at step 416 so as to not further increase the temperature of the lubricant. The method 400 then proceeds to step 414 to direct the lubricant to the gearbox assembly 46.

Alternatively, if it is determined by the electronic control unit 322 at step 406 that the temperature of the lubricant is less than the first predetermined lubricant temperature threshold, the method 400 proceeds to step 418 at which the valve 310 is positioned into the second position and the lubricant is directed into the recirculation bypass path 306. As discussed herein, the lubricant then flows through or around various engine components 307 at step 420 such that the lubricant is heated by the engine components 307.

At step 422, a temperature of the gearbox assembly 46 is detected, by the gearbox temperature sensor 318, and a determination is made, by the electronic control unit 322, whether the temperature of the gearbox assembly 46 is equal to or exceeds the predetermined gearbox temperature threshold. If the temperature of the gearbox assembly 46 is less than the predetermined gearbox temperature threshold, the electronic control unit 322 instructs the fan rotor lock at step 424 to maintain the gearbox assembly 46 in the locked position such that the fan 38 is not permitted to rotate. Thereafter, the method 400 proceeds to step 426 at which the lubricant is recirculated from the gearbox assembly 46 and proceeds to step 406 so that the lubricant continues to flow through either the supply line heating path 304 or the recirculation bypass path 306 to heat the lubricant as necessary prior to being reintroduced to the gearbox assembly 46.

Alternatively, if the temperature of the gearbox assembly 46 is equal to or exceeds the predetermined gearbox temperature threshold, the electronic control unit 322, at step 428, instructs the fan rotor lock 320 to operate into the unlocked position to allow the gearbox assembly 46 and the fan 38 to rotate. Thereafter, the method 400 proceeds to step 430 and the process ends. Thus, heating of the lubricant in the gearbox assembly 46 during a cold start condition is provided to reduce wear on the components of the gearbox assembly 46. In embodiments, the fan rotor lock 320 may automatically be operated into the unlocked position in accordance with the above method. In other embodiments, the fan rotor lock 320 provides an alert or notification to an operator indicating that the fan rotor lock 320 may be manually operated into the unlocked position. As referred to herein, a cold start condition may refer to a situation in which the turbine engine 10 (FIG. 1) begins operation within an environmental temperature below 10 degrees Fahrenheit (F) and above −40 degrees F. Specific upper temperature limits and lower temperature limits other than that described herein may be selected and stored within the electronic control unit 322 to determine when the turbine engine 10 should operate in the manner described herein.

Figure 5:
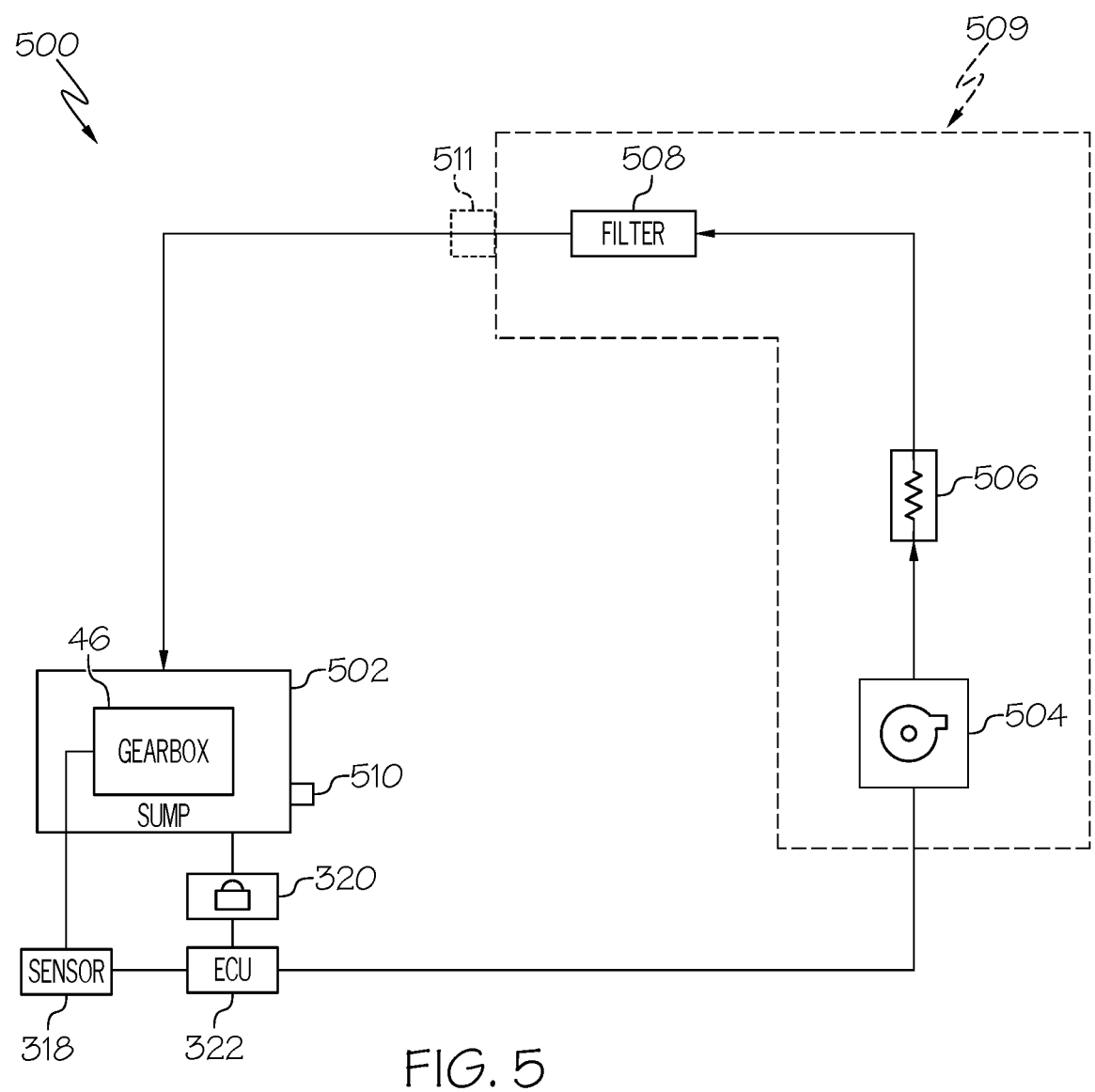
FIG. 5 schematically depicts another embodiment of a lubricant heating system, according to an embodiment of the present disclosure.

Referring now to FIG. 5, another embodiment of a lubricant heating system 500 is schematically depicted. Rather than heating the lubricant prior to being delivered to the gearbox assembly 46, as described above with respect to the lubricant heating system 300 illustrated in FIG. 3, the lubricant heating system 500 heats the gearbox assembly 46 by heating air delivered to a sump 502 surrounding the gearbox assembly 46.

With more particularity, the lubricant heating system 500 includes a blower 504 and a heater 506. The blower 504 may be any suitable blower for directing airflow such as, for example, a ground cart air starting system, compressor, auxiliary power unit, air turbine starter, on ground pneumatic start system, on ground environmental control system (ECS) support cart, or the like. The heater 506 may include any suitable heating device such as, for example, a vortex swirler, joule heating device, or the like. Accordingly, the heater 506 heats the air flowing from the blower 504 prior to being delivered to the sump 502 surrounding the gearbox assembly 46. In embodiments, the lubricant heating system 500 includes a filter 508 for removing particulates, e.g., grit, debris, and the like, within the air drawn in by the blower 504 prior to being delivered to the sump 502. The filter 508 may be any suitable air filter. In embodiments in which a ground cart 509 is utilized, the ground cart 509 may include the blower 504, the heater 506, and the filter 508. In embodiments, the ground cart 509 may be connected to and in fluid communication with the sump 502 via a connecting member 511. The connecting member 511 may include any suitable device. In such embodiments, it should be appreciated that the ground cart 509 is external of the turbine engine 10 (FIG. 1) itself and may be a combination air and power cart.

As air is delivered to the sump 502, the pressure within the sump 502 may increase. Accordingly, the sump 502 may include a vent 510 operable between an open position and a closed position. The vent 510 may be positioned into the open position, or an intermediate position between the open position and the closed position, as air is delivered into the sump 502 to prevent over-pressurization of the sump 502.

As with the lubricant heating system 300 described above and illustrated in FIG. 3, the lubricant heating system 500 further includes the gearbox temperature sensor 318, the fan rotor lock 320, and the electronic control unit 322. Accordingly, the gearbox temperature sensor 318 continually detects a temperature of the gearbox assembly 46 and transmits a signal to the electronic control unit 322 indicating a temperature of the gearbox assembly 46. The electronic control unit 322 determines whether the temperature of the gearbox assembly 46 is equal to or exceeds the predetermined gearbox temperature threshold. If so, the electronic control unit 322 transmits a signal to the fan rotor lock 320 to position the fan rotor lock 320 into an unlocked position and permit the gearbox assembly 46, and thus the fan 38 (FIG. 1), to rotate. Alternatively, if the electronic control unit 322 determines that the temperature of the gearbox assembly 46 is less than the predetermined gearbox temperature threshold, the electronic control unit 322 transmits a signal to the fan rotor lock 320 to position, or maintain a position, of the fan rotor lock 320 into a locked position to inhibit rotation of the gearbox assembly 46, and thus the fan 38 (FIG. 1). In embodiments, in which the turbine engine 10 (FIG. 1) includes the blower 504 rather than the ground cart 509 being utilized, the electronic control unit 322 may be communicatively coupled to the blower 504 to control operation thereof to continue to heat the lubricant.

Figure 6:
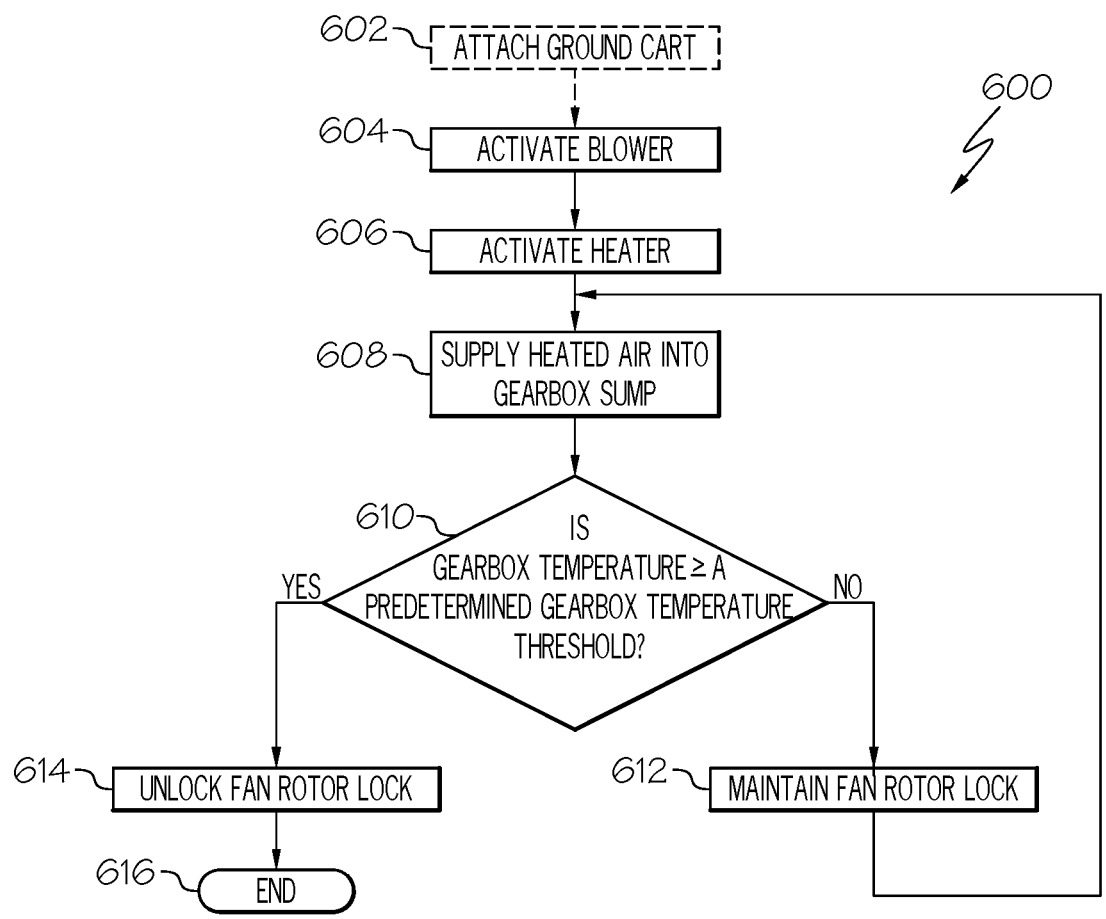
FIG. 6 depicts a flowchart for operating the lubricant heating system of FIG. 5, according to an embodiment of the present disclosure.

Referring now to FIG. 6, a method 600 is depicted for operating the lubricant heating system 500 illustrated in FIG. 5. In embodiments in which the ground cart 509 is utilized, the ground cart 509 is coupled to the sump 502 at step 602 by attaching the ground cart 509 via the connecting member 511 described herein. In other embodiments in which the ground cart 509 is not utilized, and instead the blower 504, the heater 506, and the filter 508 are separately provided, the method 600 skips step 602 and proceeds to step 604. At step 604, the blower 504 is activated to blow air toward the gearbox assembly 46. At step 606, the heater 506 is activated to heat the air flowing to the gearbox assembly 46. Although illustrated as separate steps, it should be appreciated that steps 604 and 606 may occur simultaneously of one another or in the reverse order. Thereafter, the air flows through the filter 508 to prevent particulates from entering the sump 502 surrounding the gearbox assembly 46. Accordingly, at step 608, the sump 502 receives the heated air to heat the gearbox assembly 46. Additionally, at step 608, in embodiments, the vent 510 of the sump 502 is opened to prevent over-pressurizing the sump 502, which may result in oil leakage.

At step 610, a temperature of the gearbox assembly 46 is detected, by the gearbox temperature sensor 318, and a determination is made, by the electronic control unit, whether the temperature of the gearbox assembly 46 is equal to or exceeds the predetermined gearbox temperature threshold. If the temperature of the gearbox assembly 46 is less than the predetermined gearbox temperature threshold, the electronic control unit 322 instructs the fan rotor lock 320 at step 612 to maintain the gearbox assembly 46 in the locked position such that the fan 38 is not permitted to rotate. Thereafter, the method 600 returns to step 606 at which the blower 504 continues to direct air through the heater 506 and into the sump 502. As noted above, the fan rotor lock 320 may automatically be operated into the unlocked position in accordance with the above method. In other embodiments, the fan rotor lock 320 provides an alert or notification to an operator indicating that the fan rotor lock 320 may be manually operated into the unlocked position.

Alternatively, if the temperature of the gearbox assembly 46 is equal to or exceeds the predetermined gearbox temperature threshold, the electronic control unit 322, at step 614, instructs the fan rotor lock 320 to operate into the unlocked position to allow the gearbox assembly 46 and the fan 38 to rotate. Thereafter, the method 600 proceeds to step 616 and the process ends.

Figure 7:
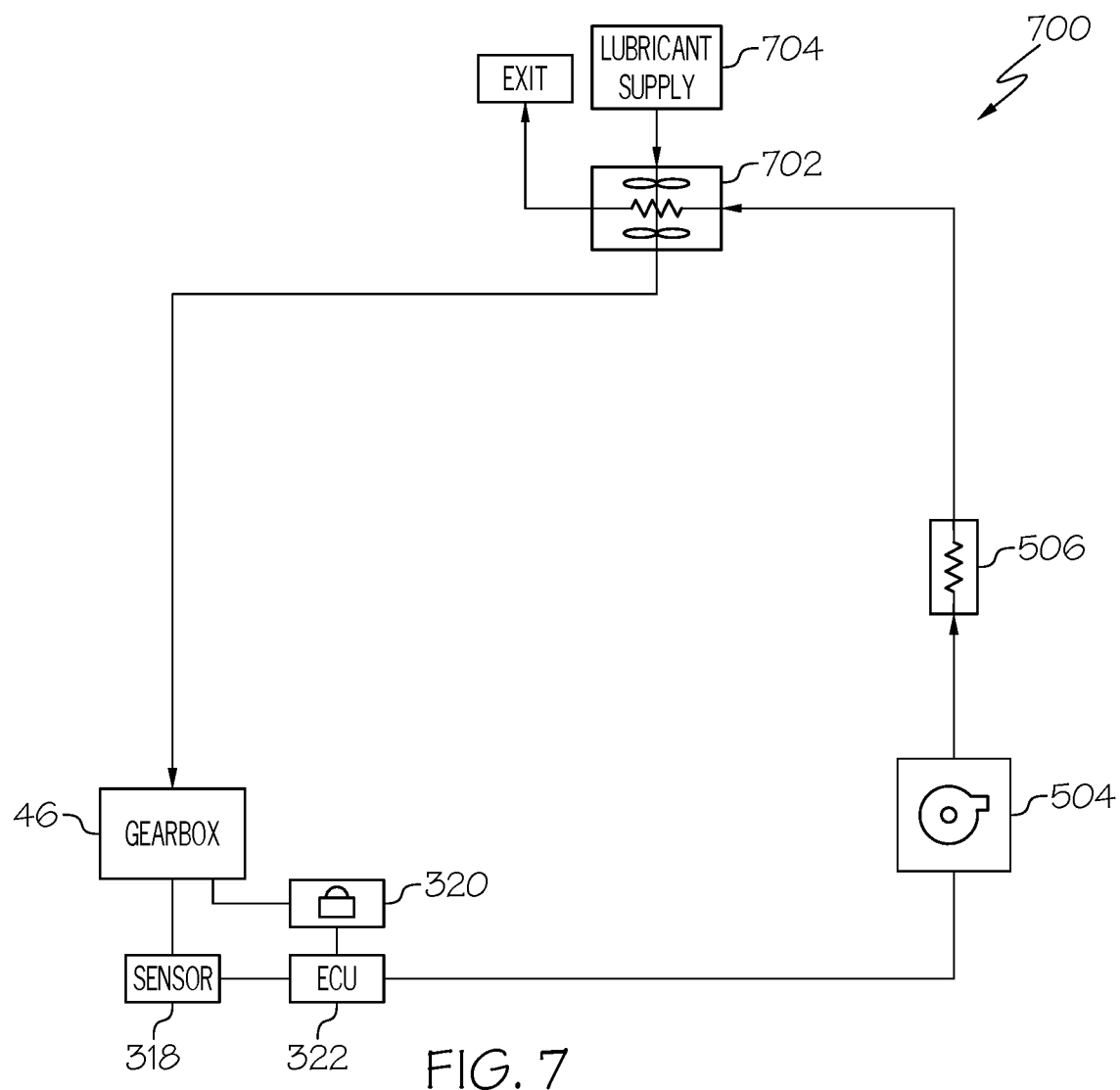
FIG. 7 schematically depicts another embodiment of a lubricant heating system, according to an embodiment of the present disclosure.

Referring now to FIG. 7, another embodiment of a lubricant heating system 700 is schematically depicted. The lubricant heating system 700 combines aspects of the lubricant heating systems 300, 500 described above. Specifically, the lubricant heating system 700 operates to heat air and uses the heated air to heat lubricant prior to the lubricant being delivered to the gearbox assembly 46.

With more particularity, as with the lubricant heating system 500 depicted in FIG. 5, the lubricant heating system 700 includes the blower 504 and the heater 506. Although FIG. 7 illustrates the blower 504 and the heater 506 as separate components, it should be appreciated that the blower 504 and the heater 506 may be incorporated into a ground cart, such as the ground cart 509 described herein and illustrated in FIG. 5. The air is heated by the heater 506 and subsequently directed to heat lubricant by flowing through a heat exchanger 702. Accordingly, heat from the heated air is drawn off of the air and provided to the lubricant flowing as each flow through the heat exchanger 702. The lubricant is provided by a lubricant supply 704 and is heated by the air prior to reaching the gearbox assembly 46. In embodiments, the lubricant supply 704 is a reservoir of lubricant. In other embodiments, the lubricant supply 704 may be lubricant recycled from the gearbox assembly 46 or other areas of the turbine engine 10.

In embodiments, the air delivered by the blower 504 is dispersed, i.e., exits the lubricant heating system 700, to the environment after heating the lubricant within the heat exchanger 702. The lubricant is then delivered to the gearbox assembly 46 to increase the temperature of various components of the gearbox assembly 46 prior to operation. In other embodiments, the air may be delivered to a sump, such as the sump 502 (FIG. 5) surrounding the gearbox assembly 46 rather than the environment to further heat the gearbox assembly 46, as disclosed in more detail herein.

As with the lubricant heating systems 300, 500 described above and illustrated in FIGS. 3 and 5, the lubricant heating system 700 further includes the gearbox temperature sensor 318, the fan rotor lock 320, and the electronic control unit 322. Accordingly, the gearbox temperature sensor 318 continually detects a temperature of the gearbox assembly 46 and transmits a signal to the electronic control unit 322 indicating a temperature of the gearbox assembly 46. The electronic control unit 322 determines whether the temperature of the gearbox assembly 46 is equal to or exceeds the predetermined gearbox temperature threshold. If so, the electronic control unit 322 transmits a signal to the fan rotor lock 320 to position the fan rotor lock 320 into an unlocked position and permit the gearbox assembly 46, and thus the fan 38, to rotate. Alternatively, if the electronic control unit 322 determines that the temperature of the gearbox assembly 46 is less than the predetermined gearbox temperature threshold, the electronic control unit 322 transmits a signal to the fan rotor lock 320 to position, or maintain a position, of the fan rotor lock 320 into a locked position to inhibit rotation of the gearbox assembly 46, and thus the fan 38.

Figure 8:
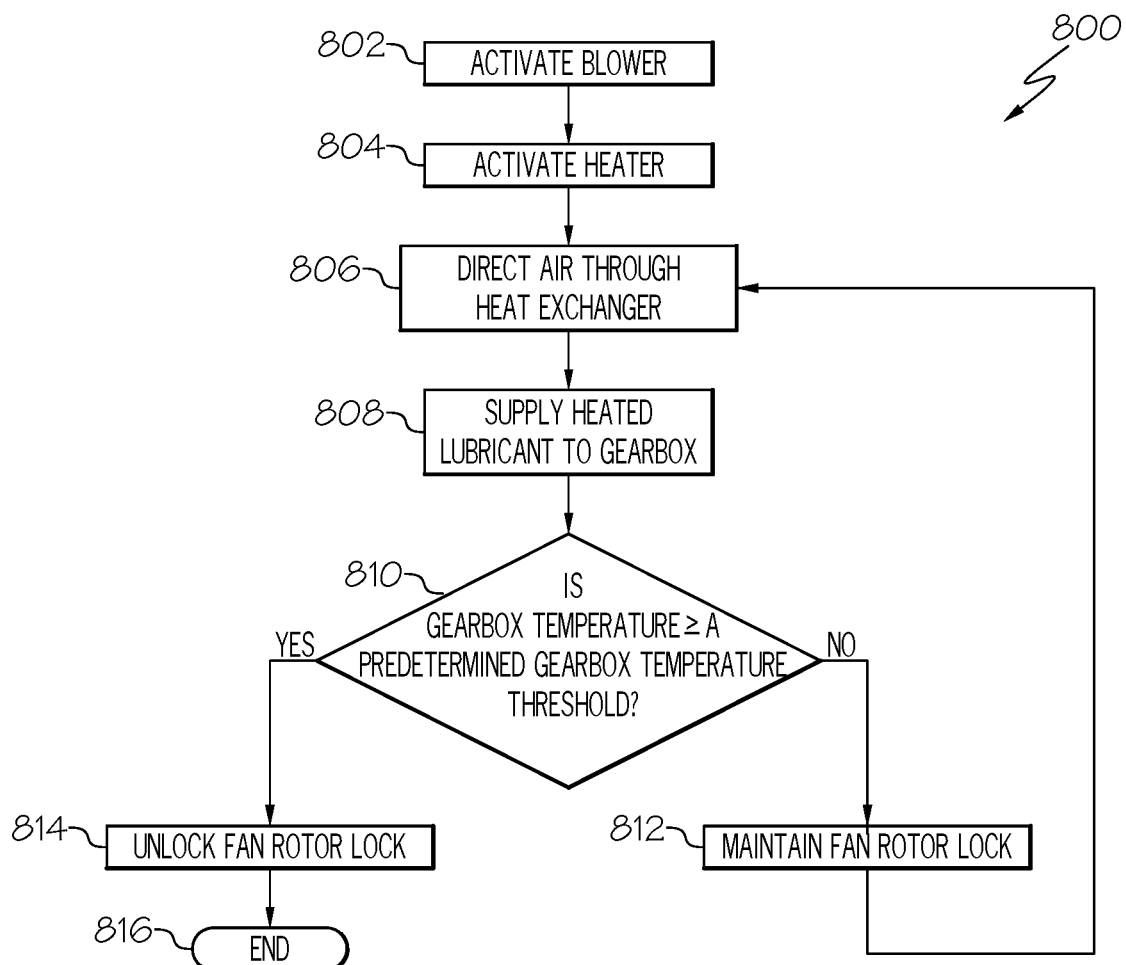
FIG. 8 depicts a flowchart for operating the lubricant heating system of FIG. 7, according to an embodiment of the present disclosure.

Referring now to FIG. 8, a method 800 is depicted for operating the lubricant heating system 700 illustrated in FIG. 7. Initially, at step 802, the blower 504 is activated to blow air toward a heat exchanger 702. At step 804, the heater 506 is activated to heat the air flowing to the heat exchanger 702. Accordingly, at step 806, the air enters the heat exchanger 702 to heat the lubricant flowing from the lubricant supply 704. At step 808, the heated lubricant is supplied to the gearbox assembly 46. Although illustrated as separate steps, it should be appreciated that steps 802 and 804 may occur simultaneously of one another or in the reverse order.

At step 810, a temperature of the gearbox assembly 46 is detected, by the gearbox temperature sensor 318, and a determination is made, by the electronic control unit 322, whether the temperature of the gearbox assembly 46 is equal to or exceeds the predetermined gearbox temperature threshold. If the temperature of the gearbox assembly 46 is less than the predetermined gearbox temperature threshold, the electronic control unit 322 instructs the fan rotor lock 320 at step 812 to maintain the gearbox assembly 46 in the locked position such that the fan 38 is not permitted to rotate. Thereafter, the method 800 returns to step 806 at which the blower 504 continues to direct air through the heater 506 and into the heat exchanger 702 for further heating of additional lubricant.

Alternatively, if the temperature of the gearbox assembly 46 is equal to or exceeds the predetermined gearbox temperature threshold, the electronic control unit 322, at step 814, instructs the fan rotor lock 320 to operate into the unlocked position to allow the gearbox assembly 46 and the fan 38 to rotate. Thereafter, the method 800 proceeds to step 816 and the process ends.

From the above, it is to be appreciated that defined herein are systems and methods for operating a gearbox assembly of a turbine engine in a cold start condition to prevent wear on components of a gearbox assembly of the turbine engine. The turbine engine includes a gearbox assembly, a pump for directing lubricant to the gearbox assembly, a valve located downstream of the pump for controlling a flow of the lubricant, a supply line heating path comprising a heat exchanger, and a recirculation bypass path, wherein the valve controls the flow of the lubricant into one of the supply line heating path and the recirculation bypass path based on a temperature of the lubricant. Systems and methods are also defined herein for heating air directed to a sump surrounding a gearbox assembly rather than heating lubricant flowing through the supply line heating path or the recirculation bypass path. Systems and methods are also defined herein for heating air used to heat lubricant flowing to a gearbox assembly. Each of the above embodiments allows the gearbox assembly to be heated at low temperatures prior to operating the components to reduce friction, wear, and overheating.

Further aspects of the embodiments described herein are provided by the subject matter of the following clauses:

Clause 1. A turbine engine comprising: a gearbox assembly; a pump for directing lubricant to the gearbox assembly; and a supply line heating path comprising a heat exchanger and a supply line heater for providing heat to the lubricant, wherein the supply line heater is operated based on a temperature of the lubricant.

Clause 2. A turbine engine comprising: a gearbox assembly; a pump for directing lubricant to the gearbox assembly; a supply line heating path comprising a heat exchanger; and a recirculation bypass path, wherein the valve controls the flow of the lubricant into one of the supply line heating path and the recirculation bypass path based on a temperature of the lubricant.

Clause 3. A turbine engine comprising: a gearbox assembly; a pump for directing lubricant to the gearbox assembly; a supply line heating path comprising a heat exchanger; a recirculation bypass path, a valve located downstream of the pump for controlling a flow of the lubricant, the valve being positionable between a first position to direct the flow of the lubricant into the supply line heating path and a second position to direct the flow of the lubricant into the recirculation bypass path; and an electronic control unit configured to position the valve between the first position and the second position based on a temperature of the lubricant based on a temperature of the lubricant.

Clause 4. The turbine engine of clause 1, wherein a first lubricant temperature sensor is located between the valve and the pump for detecting a temperature of the lubricant.

Clause 5. The turbine engine of any one of the preceding clauses, wherein the valve is positioned into the first position to direct the flow of the lubricant into the supply line heating path in response to the temperature of the lubricant is equal to or greater than a first predetermined lubricant temperature threshold, and wherein the valve is positioned into the second position to direct the flow of the lubricant into the recirculation bypass path in response to the temperature of the lubricant is less than the first predetermined lubricant temperature threshold.

Clause 6. The turbine engine of any one of the preceding clauses, wherein the recirculation bypass path passes through one or more engine components that provide heat to the lubricant, the one or more engine components selected from the group consisting of pumps, scavenge elements, sumps, bearings, gears, and accessory gearboxes.

Clause 7. The turbine engine of any one of the preceding clauses, wherein the heat exchanger of the supply line heating path is an air cooled oil cooler for drawing heat off of the lubricant.

Clause 8. The turbine engine of any one of the preceding clauses, wherein the supply line heating path further comprises a supply line heater for providing heat to the lubricant.

Clause 9. The turbine engine of any one of the preceding clauses, wherein the supply line heating path further comprises a second lubricant temperature sensor located between the heat exchanger and the supply line heater.

Clause 10. The turbine engine of any one of the preceding clauses, wherein the supply line heater is operated in a deactivated state in response to the second lubricant temperature sensor detecting the temperature of the lubricant exiting the heat exchanger is equal to or exceeds a second predetermined lubricant temperature threshold, wherein the supply line heater is operated in an activated state in response to the second lubricant temperature sensor detecting the temperature of the lubricant exiting the heat exchanger is less than the second predetermined lubricant temperature threshold.

Clause 11. The turbine engine of any one of the preceding clauses, further comprising: a gearbox temperature sensor detecting a temperature of the gearbox assembly; a fan rotor lock controlling operation of the gearbox assembly; and the electronic control unit communicatively coupled to the gearbox temperature sensor and the fan rotor lock, the electronic control unit configured to: transmit a signal to the fan rotor lock to inhibit rotation of the gearbox assembly in response to determining that the temperature of the gearbox assembly, as determined by the gearbox temperature sensor, is less than a predetermined gearbox temperature threshold; and transmit a signal to the fan rotor lock to permit rotation of the gearbox assembly in response to determining that the temperature of the gearbox assembly, as determined by the gearbox temperature sensor, is equal to or greater than the predetermined gearbox temperature threshold.

Clause 12. A turbine engine comprising: a gearbox assembly; a sump surrounding the gearbox assembly, the sump receiving heated air to heat the gearbox assembly; and a fan rotor lock inhibiting operation of the gearbox assembly until a temperature of the gearbox assembly is equal to or exceeds a predetermined gearbox temperature threshold.

Clause 13. The turbine engine of any one of the preceding clauses, further comprising: a blower for blowing the air; a heater for heating the air; and a filter located downstream of the heater for filtering particulates from the air prior to entering the sump.

Clause 14. The turbine engine of any one of the preceding clauses, wherein the sump comprises a vent operable into an open position to prevent overpressurization when receiving air from a blower.

Clause 15. The turbine engine of any one of the preceding clauses, further comprising: a gearbox temperature sensor detecting the temperature of the gearbox assembly; an electronic control unit communicatively coupled to the gearbox temperature sensor and the fan rotor lock, the electronic control unit configured to: transmit a signal to the fan rotor lock to inhibit rotation of the gearbox assembly in response to determining that the temperature of the gearbox assembly, as determined by the gearbox temperature sensor, is less than the predetermined gearbox temperature threshold; and transmit a signal to the fan rotor lock to permit rotation of the gearbox assembly in response to determining that the temperature of the gearbox assembly, as determined by the gearbox temperature sensor, is equal to or greater than the predetermined gearbox temperature threshold.

Clause 16. The turbine engine of any one of the preceding clauses, wherein the blower is a ground cart air starting system.

Clause 17. A method comprising: activating a pump to direct lubricant to a gearbox assembly; detecting a temperature of the lubricant; operating a valve between a first position and a second position to direct the lubricant into one of a supply line heating path and a recirculation bypass path based on the detected temperature of the lubricant; and operating a fan rotor lock between a locked position and an unlocked position to inhibit operation of the gearbox assembly until a temperature of the gearbox assembly is equal to or exceeds a predetermined gearbox temperature threshold.

Clause 18. The method of any one of the preceding clauses, further comprising: operating the valve into the first position to direct the lubricant into the supply line heating path when the detected temperature of the lubricant is equal to or greater than a first predetermined lubricant temperature threshold; and operating the valve into the second position to direct the lubricant into the recirculation bypass path when the detected temperature of the lubricant is less than the first predetermined lubricant temperature threshold.

Clause 19. The method of any one of the preceding clauses, wherein the supply line heating path comprises a heat exchanger and a supply line heater located downstream of the heat exchanger, the method further comprising: operating the supply line heater in a deactivated state in response detecting that the temperature of the lubricant exiting the heat exchanger is equal to or exceeds a second predetermined lubricant temperature threshold; and operating the supply line heater in an activated state in response to determining that the temperature of the lubricant exiting the heat exchanger is less than the second predetermined lubricant temperature threshold.

Clause 20. The method of any one of the preceding clauses, wherein the heat exchanger of the supply line heating path is an air cooled oil cooler for drawing heat off of the lubricant.

Clause 21. The method of any one of the preceding clauses, further comprising circulating the lubricant from the gearbox assembly to the pump.

Clause 22. The method of any one of the preceding clauses, wherein the recirculation bypass path passes through one or more engine components that provide heat to the lubricant, the one or more engine components selected from the group consisting of pumps, scavenge elements, sumps, bearings, gears, and accessory gearboxes.

Clause 23. A method comprising activating a blower for blowing air; activating a heater for heating the air; directing the heated air to a sump surrounding a gearbox assembly located downstream of the heater, the sump receiving the heated air from the blower to heat the gearbox assembly; and operating a fan rotor lock between a locked position and an unlocked position to inhibit operation of the gearbox assembly until a temperature of the gearbox assembly is equal to or exceeds a predetermined gearbox temperature threshold.

Clause 24. The method of any one of the preceding clauses, further comprising wherein filtering particulates from the air prior to entering the sump by a filter located downstream of the heater.

Clause 25. The method of any one of the preceding clauses, further comprising preventing over-pressurization when receiving air from the blower by operating a vent of the sump into an open position.

Clause 26. The method of any one of the preceding clauses, further comprising detecting a temperature of the gearbox assembly; transmitting a signal to the fan rotor lock to inhibit rotation of the gearbox in response to determining that the temperature of the gearbox assembly, as determined by the gearbox temperature sensor, is less than a predetermined gearbox temperature threshold; and transmitting a signal to the fan rotor lock to permit rotation of the gearbox assembly in response to determining that the temperature of the gearbox assembly, as determined by the gearbox temperature sensor, is equal to or greater than the predetermined gearbox temperature threshold.

Clause 27. The method of any one of the preceding clauses, wherein the blower is a ground cart air starting system.

Clause 28. A turbine engine comprising: a gearbox assembly; a lubricant supply directing lubricant to the gearbox assembly; a heat exchanger located upstream of the gearbox assembly through which the lubricant flows; a blower for directing air through the heat exchanger and heating the lubricant; and a fan rotor lock inhibiting operation of the gearbox assembly until a temperature of the gearbox assembly is equal to or exceeds a predetermined gearbox temperature threshold.

It will be apparent to those skilled in the art that various modifications and variations can be made to the embodiments described herein without departing from the scope of the claimed subject matter. Thus, it is intended that the specification to cover the modifications and variations of the various embodiments described herein provided such modifications and variations come within the scope of the appended claims and their equivalents.

What is claimed is:

1. A turbine engine comprising:
a gearbox assembly;
a pump for directing lubricant to the gearbox assembly;
a supply line heating path comprising a heat exchanger for cooling the lubricant and a supply line heater, the heat exchanger is arranged in series upstream of the supply line heater;
a recirculation bypass path;
a valve located downstream of the pump for controlling a flow of the lubricant, the valve being positionable between a first position to direct the flow of the lubricant into the supply line heating path and a second position to direct the flow of the lubricant into the recirculation bypass path, wherein the supply line heating path extends from the valve to the gearbox assembly and the recirculation bypass path extends from the valve to the supply line heating path only at a downstream end of the supply line heater; and
an electronic control unit configured to position the valve between the first position and the second position based on a temperature of the lubricant.

2. The turbine engine of claim 1, wherein a first lubricant temperature sensor is located between the valve and the pump for detecting a temperature of the lubricant.

3. The turbine engine of claim 2, wherein the valve is positioned into the first position to direct the flow of the lubricant into the supply line heating path in response to the temperature of the lubricant is equal to or greater than a first predetermined lubricant temperature threshold, and wherein the valve is positioned into the second position to direct the flow of the lubricant into the recirculation bypass path in response to the temperature of the lubricant is less than the first predetermined lubricant temperature threshold.

4. The turbine engine of claim 1, wherein the recirculation bypass path passes through one or more engine components that provide heat to the lubricant, the one or more engine components selected from the group consisting of pumps, scavenge elements, sumps, bearings, gears, and accessory gearboxes.

5. The turbine engine of claim 4, wherein the recirculation bypass path includes a one-way valve positioned downstream of the one or more engine components, the one-way valve preventing the lubricant from flowing back towards the one or more engine components.

6. The turbine engine of claim 1, wherein the heat exchanger of the supply line heating path is an air cooled oil cooler for drawing heat off of the lubricant.

7. The turbine engine of claim 1, wherein the supply line heating path further comprises a second lubricant temperature sensor located between the heat exchanger and the supply line heater.

8. The turbine engine of claim 7, wherein the supply line heater is operated in a deactivated state in response to the second lubricant temperature sensor detecting the temperature of the lubricant exiting the heat exchanger is equal to or exceeds a second predetermined lubricant temperature threshold, wherein the supply line heater is operated in an activated state in response to the second lubricant temperature sensor detecting the temperature of the lubricant exiting the heat exchanger is less than the second predetermined lubricant temperature threshold.

9. The turbine engine of claim 1, further comprising:
a gearbox temperature sensor detecting a temperature of the gearbox assembly;
a fan rotor lock controlling operation of the gearbox assembly; and
the electronic control unit communicatively coupled to the gearbox temperature sensor and the fan rotor lock, the electronic control unit configured to:
transmit a signal to the fan rotor lock to inhibit rotation of the gearbox assembly in response to determining that the temperature of the gearbox assembly, as determined by the gearbox temperature sensor, is less than a predetermined gearbox temperature threshold; and
transmit a signal to the fan rotor lock to permit rotation of the gearbox assembly in response to determining that the temperature of the gearbox assembly, as determined by the gearbox temperature sensor, is equal to or greater than the predetermined gearbox temperature threshold.

10. The turbine engine of claim 1, wherein the supply line heating path includes a one-way valve positioned downstream of the heat exchanger and the supply line heater and the recirculation bypass path connects to the supply line heating path downstream of the one-way valve.

11. A method comprising:
activating a pump to direct lubricant to a gearbox assembly;
detecting a temperature of the lubricant;
operating a valve between a first position and a second position to direct the lubricant into one of a supply line heating path and a recirculation bypass path based on the detected temperature of the lubricant, the supply line heating path comprising a heat exchanger for cooling the lubricant and a supply line heater, the heat exchanger is arranged in series upstream of the supply line heater, wherein the supply line heating path extends from the valve to the gearbox assembly and the recirculation bypass path extends from the valve to the supply line heating path only at a downstream end of the supply line heater; and
operating a fan rotor lock between a locked position and an unlocked position to inhibit operation of the gearbox assembly until a temperature of the gearbox assembly is equal to or exceeds a predetermined gearbox temperature threshold.

12. The method of claim 11, further comprising:
operating the valve into the first position to direct the lubricant into the supply line heating path when the detected temperature of the lubricant is equal to or greater than a first predetermined lubricant temperature threshold; and
operating the valve into the second position to direct the lubricant into the recirculation bypass path when the detected temperature of the lubricant is less than the first predetermined lubricant temperature threshold.

13. The method of claim 11, wherein the supply line heater is located downstream of the heat exchanger, the method further comprising:
operating the supply line heater in a deactivated state in response to detecting that the temperature of the lubricant exiting the heat exchanger is equal to or exceeds a second predetermined lubricant temperature threshold; and
operating the supply line heater in an activated state in response to determining that the temperature of the lubricant exiting the heat exchanger is less than the second predetermined lubricant temperature threshold.

14. The method of claim 13, wherein the heat exchanger of the supply line heating path is an air cooled oil cooler for drawing heat off of the lubricant.

15. The method of claim 11, further comprising circulating the lubricant from the gearbox assembly to the pump.

16. The method of claim 11, wherein the recirculation bypass path passes through one or more engine components that provide heat to the lubricant, the one or more engine components selected from the group consisting of pumps, scavenge elements, sumps, bearings, gears, and accessory gearboxes.

17. The method of claim 16, wherein the recirculation bypass path includes a one-way valve positioned downstream of the one or more engine components, the method further comprising preventing the lubricant from flowing back towards the one or more engine components with the one-way valve.

18. The method of claim 11, wherein the supply line heating path includes a one-way valve positioned downstream of the heat exchanger and the supply line heater and the recirculation bypass path connects to the supply line heating path downstream of the one-way valve.

19. The method of claim 11, wherein the heat exchanger of the supply line heating path is an air cooled oil cooler, the method further comprising drawing heat off of the lubricant with air through the air cooled oil cooler.

20. The method of claim 11, further comprising detecting the temperature of the lubricant with a lubricant temperature sensor that is located between the valve and the pump for detecting a temperature of the lubricant.

* * * * *